Sept. 10, 1946.  O. M. SUMMERS  2,407,586
STRESS FREE STUD
Filed Feb. 16, 1944
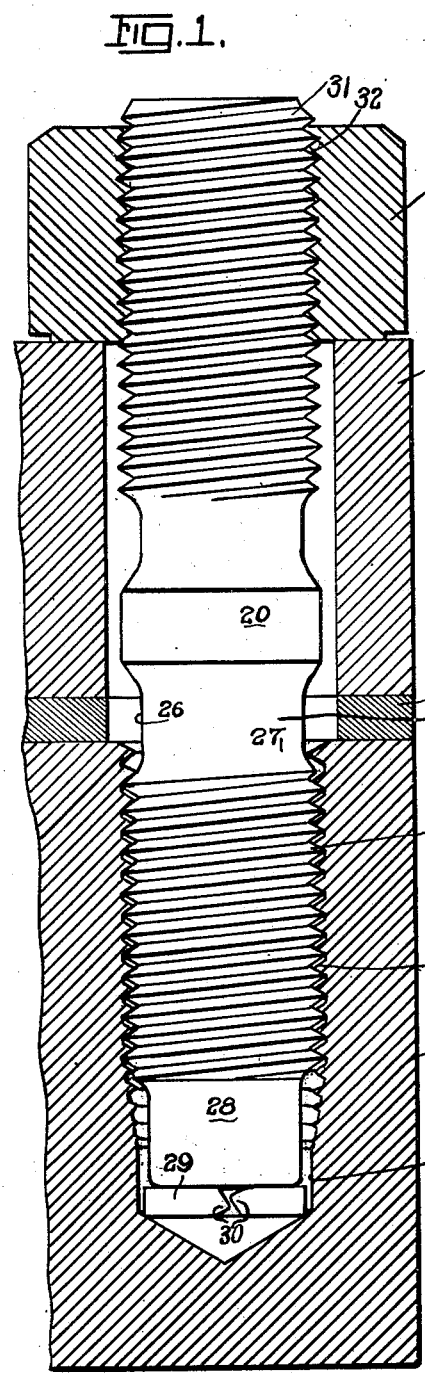
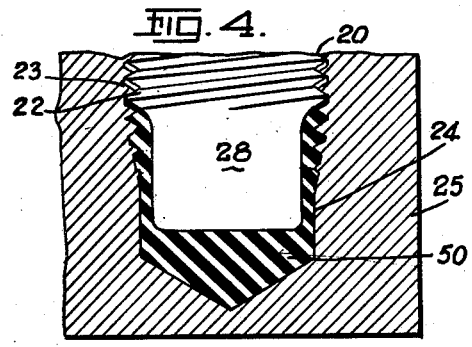
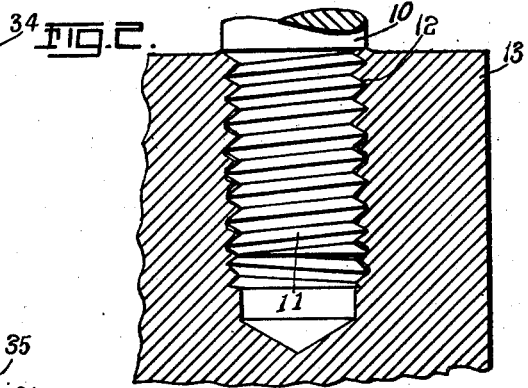
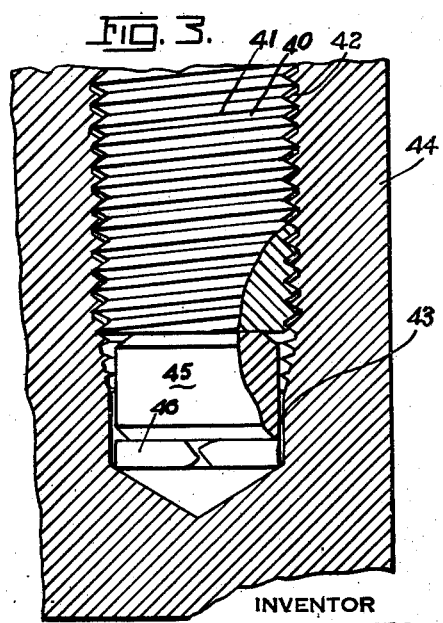
INVENTOR
OTTO M. SUMMERS.
BY
Toulmin & Toulmin
ATTORNEYS Patented Sept. 10, 1946

2,407,586

UNITED STATES PATENT OFFICE 2,407,586

STRESS-FREE STUD

Otto M. Summers, Mount Gilead, Ohio, assignor to H-P-M Development Corporation, Wilmington, Del., a corporation of Delaware Application February 16, 1944, Serial No. 522,536

12 Claims. (Cl. 151—32)

This invention relates to studs and the member in which they are mounted so as to distribute the stress applied upon the stud substantially uniformly throughout the threaded length thereof. The invention particularly relates to highly stressed studs, of which one class is known as prestressed studs that are loaded to the maximum stress condition that will normally be received by the stud under any conditions that influence the operating mechanisms held by the studs.

One of the major difficulties with studs of the conventional type that are provided with standard threads and are adapted to be threaded into tapped holes is that the stress applied to the stud to tighten the same in the hole causes a localized stress in the stud that is located just below the thread line.

In order to relieve localized stresses in studs it has been suggested to provide as near 100% thread contact of the stud with the threads in the tapped hole for the same as possible, tending to distribute the stress load over as great a number of threads as possible, or to provide special thread designs, or to provide shoulders on the studs that are brought into engagement with the member in which the stud is supported so as to approach the stress conditions developed in the ordinary cap screw. All of these prior developments are more or less centered around the maintenance of accurately dimensioned threads on the stud and in the hole to receive the same so as to obtain as near as possible an accurate axial alignment of the stud in the hole and thereby relieve any angular stresses set up in the stud when it is used to secure one object upon another.

An object of this invention is to provide a stud that can be positioned in a standard tapped hole so that localized stresses in the stud are substantially eliminated.

Still another object of the invention is to provide a stud in accordance with the foregoing object wherein the stud is threaded into the tapped hole in a relatively free, or floating, condition so that but slight effort is required for this operation, and wherein means is associated with the stud which causes all of the threads of the stud to frictionally engage the threads of the tapped hole in which the stud is placed for holding the same in the hole in locked condition therein in a manner that a relatively high torque effort is required to initially release the stud from the tapped hole, but which when once released can be readily removed from the tapped hole with relatively little effort.

Still another object of the invention is to provide a relatively stress free stud mounting arrangement wherein the threaded portion of the stud may be termed undersize from standard thread practice design for threading into a tapped hole that is of standard size according to thread practice design, so that the stud can be freely threaded into the threaded hole which receives the same and resilient means is provided for frictionally engaging the threads of the stud with the threads of the hole in which it is received for thereby preventing removal of the stud from the hole unless a relatively high torque effort is applied upon the stud.

Still another object of the invention is to provide a stud with an undersize threaded body portion that is inserted in a standard size tapped hole and the resilient washer causes frictional engagement of the stud threads with the hole threads to prevent removal of the stud from the hole.

A still further object of the invention is to provide a stud in accordance with any of the foregoing objects wherein the stress load applied upon the stud is distributed over substantially the entire thread length thereof without causing any localization of stresses at the thread line of the stud.

Further objects and advantages will become apparent from the drawing and the following description.

In the drawings:

Figure 1 is a vertical cross-sectional view of a mechanism illustrating the use of the stud of this invention for securing members together.

Figure 2 is a cross-sectional view illustrating the manner of mounting a stud according to conventional practice.

Figure 3 is a cross-sectional view of a portion of a stud similar to that illustrated in Figure 1 but showing a slightly modified arrangement thereof.

Figure 4 is a cross-sectional view showing a modified arrangement for obtaining an axial force upon the stud of this invention by means of a plug of rubber-like material.

According to what may be termed conventional stud mounting practice, as illustrated in Figure 2, a stud body 10 is provided with a threaded end 11 thereon that is received in a threaded hole 12 of any suitable mounting member 13. In cutting the threads 11 on the stud body 10 the maximum diameter of the threaded portion is substantially the same as the diameter of the stud body, and are cut to tolerances allowed by standard thread practice. The threaded hole 12 is also tapped with the threads therein according to standard thread practice so that when the threaded end 11 of the stud is inserted in the threads of the hole 12 there will be a certain amount of friction developed therebetween when the stud 10 is threaded into place. When the thread line of the stud 10 reaches the top of the threaded hole 12 it may then be tightened by suitable degree of torque being applied thereon. It has been found in practice that when studs are inserted into a supporting member in this manner that the threaded portion of the stud becomes highly stressed just below the thread line of the stud, generally one or two threads below the thread line. This is probably caused by the degree of misalignment between the threads on the stud and the threads in the supporting member, and by the stress set up by the thread line shoulder on the stud engaging the angular surfaces of the threads in the hole which tend to throw the body of the stud angularly relatively to the axis of the hole.

When studs of this nature are placed under a highly stressed condition and particularly when the stress is of a cyclic nature, the studs tend to fatigue and crack just below the thread line.

The attempts of correction have been to accurately size the threads on the stud as well as the threads in the hole which receives the same to provide as nearly 100% contact between the threads as possible. This, of course, has entailed careful manufacturing operations and the use of special lubricants in order to thread the studs into position in their supporting members. On the other hand, various shoulders have been provided on the studs that were adapted to engage the surface of the supporting member tending to maintain the alignment between the stud and the hole, but even in these instances the major load of the stress upon the stud is carried by the top two or three threads upon the stud in the same manner as heretofore referred to.

In this invention, however, the stud 20 is provided with a body portion 21 that has the lower end thereof provided with threads 22. The threads 22 of the stud 20 are received by the threads 23 provided in the tapped hole 24 located in the support member 25 which may be any suitable device.

The tapped hole 24 is first drilled with a suitable size drill to provide the lead for the tap for tapping the hole. The tap used in tapping the hole which has been previously drilled, is a standard tap for producing threads 23 in the hole 24 according to standard thread practice.

The threads 22 that are cut on the stud 20 are what may be termed undersize threads according to standard thread practice with regard to the size of the threads 23 so that the threads 22 are a relatively loose fit within the threads 23. The threads 22 are in practice actually made sufficiently undersize relatively to the threads 23 that the stud 20 can be threaded freely by hand without the use of auxiliary tools. As a general rule the stud end thread 22 can be undersize on pitch diameter ½ of 1% of the bar size plus .002 inch.

The stud 20 is provided with an undercut portion 26 that is slightly smaller in diameter than the minor or root diameter of the thread 22. In general this may be stated to be 3% under normal or root diameter. The undercut portion 26 is connected with the thread line by a chamfer 27 and the sharp corners of the chamfer are broken. By providing the stud 20 with an undercut portion 26 the axial thrust or stress produced in the stud 20 is transmitted into the threaded portion of the stud a substantial distance away from the minor or root diameter of the threads and thus relieves localized stress.

The lower end portion 28 of the body 21 of the stud 20 is slightly smaller than the minor or root diameter of the thread 22 and engages a spring washer 29 located in the bottom of the hole 24. The spring washer, or lock washer 29, is preferably provided with rounded or chamfered corners 30 to prevent the same from digging into the end of the stud 20 and producing shavings which may in some way get into the mechanism that is being assembled by the use of the studs.

The upper end 31 of the stud 20 may be provided with threads 32 produced according to standard thread practice to receive a nut 33 that is threaded according to standard practice to be placed upon the threads 32. The nut 33 secures any desired member 34 upon the member 25, and a suitable metal gasket 35 may be positioned therebetween if desired.

When the stud 20 is to be assembled upon the member 25, the spring lock washer 29 is placed in the hole 24 and then the threads 22 of the stud 20 are threaded into and received by the threads 23 in the hole 24. When the stud 20 is being threaded downwardly into the hole 24, the undersize threads 22 will thread freely in the threads 23, and actually a slight clearance is provided therebetween. This operation can usually be performed by hand and without the use of auxiliary tools. When the bottom portion 28 of the stud 20 contacts the spring lock washer 29 a suitable torque wrench can be applied to the stud 20 whereby to urge the same downwardly into the hole 24, forcing the end 28 against the spring lock washer 29 to compress the same. Compression of the spring lock washer 29 urges the upper faces of the threads 22 against the lower faces of the threads 23 so that each and every thread along the threaded lower end portion of the stud 20 engages a thread in the hole 24 by frictional contact. The threads 22 are retained in this position by the spring lock washer 29 tending to continuously urge the stud 20 upwardly.

When the stud 20 is inserted in the hole 24 in this manner, it will be noted that there will be no single point of localized stress in the stud because the looseness of the stud threads in the threads in the hole during insertion of the stud therein permits freedom of movement, or floating movement, of the stud in the hole to permit the threads 22 to engage uniformly the threads 23 of the hole 24. It will be noted that there is no localized stress at the thread line of the stud in the manner heretofore referred to with reference to Figure 2. When the nut 33 is now applied upon the upper threaded end 32 of the stud 20 and tightened with a suitable torque wrench to pre-stress the stud 20 to any desired degree, it will be apparent that the stress load carried by the stud 20 will be distributed over the entire area of the threads 22.

With the threads 22 in frictional engagement with the threads 23 throughout substantially the entire length thereof, there is provided a relatively large frictional surface area of metal to metal engagement between the stud 20 and the member 25 which resists any turning or torque movement of the stud 20, and this frictional engagement between the threads 22 and 23 is maintained by the spring lock washer 29 so that the nut 33 can be applied and removed from the upper threaded end 32 of the stud without causing rotation of the stud in the hole 24. In fact, in actual practice it has been found that the studs may be assembled in their holes and the spring lock washer 29 compressed with relatively complete freedom of movement during the assembly operation, and that after the studs have set in position in their threaded holes for a relatively short period of time the frictional contact between the threads 22 and the threads 23 become so great that a force substantially greater is required to initially release the stud to remove the same from the hole 24 than was required to place the same in position. However, as soon as the static frozen condition between the threads 22 and 23 is broken, the stud may be rotated relatively freely by means of a wrench until the end portion 28 of the stud moves upwardly away from the spring lock washer 29 to relieve the force thereof from the stud 20, and subsequently the stud may be removed from the hole 24 relatively freely by hand.

In Figure 3 there is shown a slightly modified arrangement of the stud illustrated in Figure 1, and which may be used to adapt the use of the principles of this invention to studs that are used for replacement in existing mechanisms.

In general, the stud 40, shown in Figure 3, having the threads 41 thereof, is constructed in the same manner as the stud 20, illustrated in Figure 1, so that the threads 41 thereof engage the threads 42 of the hole 43 in the member 44 in the same manner as heretofore described. However, in this modification the end portion 28 of the stud, as illustrated in Figure 1, is replaced by a loose pilot member 45 that is inserted in the hole 43 to rest upon the spring lock washer 46. The pilot member 45, or plug, performs the same function as the end portion 28 of the stud 20 heretofore described.

If it is desired to replace studs on existing equipment, this arrangement can be used. Also, the loose pilot or plug member 45 permits the use of the stud in relatively deep holes without the necessity of making the pilot member integral with the stud. The arrangement illustrated in Figure 3, also permits an adaptation of the principles of this invention to studs that are used on existing equipment because the studs can be rethreaded to an undersize condition comparable of that referred to in connection with the description of the stud 20 and the loose pilot member 45 be inserted in the hole so that the compression of the spring lock washer 46 can perform its function upon the stud 40 to retain the threads 41 thereof in engagement with the threads 42. Also, the stud that is being reworked can have the shank portion thereof undercut in the same manner as the undercut portion 26, illustrated in Figure 1, it having been found in practice that when the principles of this invention are applied to studs that, as a general rule, the diameter of the stud can be reduced because the localized stresses have been removed from the stud.

In Figure 4, there is shown a modified arrangement for obtaining an angle thrust upon the stud 20 to force the upper faces of the threads of the stud into engagement with the lower faces of the threads in the tapped hole 24. In this arrangement a rubber plug 50, or a plug of material of a rubber like substance, such as the synthetic rubbers, is dropped into the tapped hole 24 and then the stud 20 is threaded into the hole 24 in the manner heretofore described. The lower end portion 28 of the stud 20 engages the rubber like material and compresses the same in the lower portion of the tapped hole 24. The compression of the rubber plug 50 places an axial thrust upon the stud 20 to thereby cause engagement of the threads 22 thereof with the threads 23 of the tapped hole 24, in the same manner as heretofore described.

While the mechanical arrangement of the device disclosed and described herein constitutes a preferred form of the device, yet, it will be understood that it is capable of mechanical alteration without departing from the spirit of the invention, and that all such modifications as fall within the scope of the appended claims are intended to be included herein.

Having thus fully described my invention what I claim as new and desire to secure by Letters Patent is:

1. A stud fastening mechanism that includes a member having a threaded hole therein, a stud having a thread portion thereon received in the threads of the threaded hole, the clearance between the threads on the threaded portion of the stud and the threads in the hole being greater than the maximum clearance permitted between such threads according to the tolerances allowed in standard thread practice whereby the threads on the stud are a relatively loose fit in the threads in the hole as gauged by standard thread practice, and resilient means within the threaded hole engaged by the stud whereby to apply an axial force upon the stud to cause frictional engagement between one side of the threads on the stud and one side of the threads in the hole.

2. A stud fastening mechanism that includes a member having a threaded hole therein, a stud having a thread portion thereon received in the threads of the threaded hole, the clearance between the threads on the threaded portion of the stud and the threads of the hole exceeding the maximum clearance permitted between such threads according to the tolerances allowed by standard thread practice, whereby the threads on the stud are a relatively loose fit in the threads in the hole, resilient means within the threaded hole engaged by the stud whereby to apply an axial force upon the stud to cause frictional engagement between one side of the threads on the stud and one side of the threads in the hole, and a body portion of said stud in juxtaposition to the innermost thread of said threaded portion having a diameter not greater than the minor or root diameter of the threads thereon to prevent localization of stress at the root diameter of said threads on said stud.

3. A stud fastening mechanism that includes a member having a threaded hole therein, a stud having a thread portion thereon received in the threads of the threaded hole, the clearance between the threads on the threaded portion of the stud and the threads in the hole being greater than the maximum clearance permitted between such threads according to the tolerances allowed in standard thread practice whereby the threads on the stud are a relatively loose fit in the threads in the hole, resilient means within the threaded hole engaged by the stud whereby to apply an axial force upon the stud to cause frictional engagement between one side of the threads on the stud and one side of the threads in the hole, and a body portion of said stud in juxtaposition to the innermost thread of said threaded portion having a diameter not greater than the minor or root diameter of the threads thereon and joined with the threaded portion of the stud by means of a chamfered stud body portion to prevent localization of stress at the root diameter of said threads on said stud.

4. A stud fastening device that includes, a member having a threaded hole therein, a stud member having threads on an end portion thereof having a root diameter greater than the diameter of the body portion of the stud in juxtaposition to the innermost thread thereon and which are undersize relatively to the threads in the hole in said first member that the clearance between the threads of the stud and the threads in the hole is greater than the maximum clearance permitted between such threads according to the tolerances allowed in standard thread practice whereby a relatively loose thread fit therebetween is provided as gauged by standard thread practice thereby preventing localization of stresses in the stud at the first thread line in the stud adjacent said body portion, and resilient means within said threaded hole in said first member engaged by said stud for applying an axial force thereon to cause axial movement of the stud in the hole to place one side of the threads on the stud in frictional engagement with one side of the threads in said hole to thereby distribute the stress load on the stud over all the threads thereof and prevent rotation thereof tending to remove the stud from the hole.

5. A stud fastening device that includes, a member having a threaded hole therein, a stud member having threads on an end portion thereof having a root diameter greater than the diameter of the body portion of the stud in juxtaposition to the innermost thread thereon and which are undersize relatively to the threads in the hole in said first member that the clearance between the threads of the stud and the threads in the hole is greater than the maximum clearance permitted between such threads according to the tolerances allowed in standard thread practice whereby a relatively loose thread fit therebetween is provided as gauged by standard thread practice thereby preventing localization of stresses in the stud at the first thread line in the stud adjacent said body portion, and a spring lock washer in said hole engaged by the bottom of said stud for applying an axial force thereon to cause axial movement of the stud in the hole to place one side of the threads on the stud in frictional engagement with one side of the threads in said hole to thereby distribute the stress load on the stud over all the threads thereof and prevent rotation thereof tending to remove the stud from the hole.

6. A stud fastening device that includes, a member having a threaded hole therein, a stud member having threads on an end portion thereof having a root diameter greater than the diameter of the body portion of the stud in juxtaposition to the innermost thread thereon and which are undersize relatively to the threads in the hole in said first member that the clearance between the threads of the stud and the threads in the hole is greater than the maximum clearance permitted between such threads according to the tolerances allowed in standard thread practice whereby a relatively loose thread fit therebetween is provided as gauged by standard thread practice thereby preventing localization of stresses in the stud at the first thread line in the stud adjacent said body portion, said stud being positioned within said hole with the innermost thread on said stud disposed within said hole and below the surface of the member in which said hole is placed and with the body portion of the stud that is in juxtaposition to said innermost thread out of contact with said member, and resilient means within said threaded hole in said first member engaged by said stud for applying an axial force thereon to cause axial movement of the stud in the hole to place one side of the threads on the stud in frictional engagement with one side of the threads in said hole to thereby distribute the stress load on the stud over all the threads thereof and prevent rotation thereof tending to remove the stud from the hole.

7. A stud fastening device that includes, a member having a threaded hole therein, a stud member having threads on an end portion thereof having a root diameter greater than the diameter of the body portion of the stud in juxtaposition to the innermost thread thereon and which are undersize relatively to the threads in the hole in said first member that the clearance between the threads of the stud and the threads in the hole is greater than the maximum clearance permitted between such threads according to the tolerances allowed in standard thread practice whereby a relatively loose thread fit therebetween is provided as gauged by standard thread practice thereby preventing localization of stresses in the stud at the first thread line in the stud adjacent said body portion, resilient means within said hole beneath said stud, and a pilot member between said resilient means and said stud whereby the expansive force of said resilient means urges said pilot member and said stud axially to cause frictional engagement between one side of the threads on said stud and one side of the threads in said hole to thereby cause distribution of stress applied upon said stud over all the threads thereof and to prevent rotation of said stud tending to remove the same from said member.

8. A stud for receiving high axial stresses that consists of a stud body member, threads on an end portion of said body member that are undersize as gauged by standard thread practice relatively to the threads of a hole that are adapted to receive the same so that the clearance between the stud threads and the threads in the hole with which they cooperate is greater than the maximum clearance permitted according to the tolerances allowed in standard thread practice, said stud body having a portion thereof adjacent the innermost thread provided with a diameter not greater than the root diameter of said threads, whereby said body portion will be disposed out of engagement with the threads in a hole that is adapted to receive said stud and prevent localization of stress in the stud at the thread line thereof.

9. A stud for receiving high axial stresses that consists of a stud body member, threads on an end portion of said body member that are undersize as gauged by standard thread practice relatively to the threads of a hole that are adapted to receive the same so that the clearance between the stud threads and the threads in the hole with which they cooperate is greater than the maximum clearance permitted according to the tolerances allowed in standard thread practice, said stud body having a portion thereof adjacent the innermost thread provided with a diameter not greater than the root diameter of said threads and contiguous with said innermost thread by a chamfered body portion extending therebetween, whereby said body portion will be disposed out of engagement with the threads in a hole that is adapted to receive said stud and prevent localization of stress in the stud at the thread line thereof.

10. A stud fastening mechanism that includes a member having a threaded hole therein, a stud having a threaded portion thereon received in the clearance between the threads of the threaded hole, the threads on the threaded portion of the stud and the threads in the hole being greater than the maximum clearance permitted between such threads according to the tolerances allowed in standard thread practice whereby the threads on the stud are a relatively loose fit in the threads in the hole as gauged by standard thread practice, a member extending from the end of said stud toward the bottom of said hole having a diameter less than that of said hole, a member of rubber like material disposed within the threaded hole and engaged by said member extending from said stud to compress the rubber like material between said extending member and said hole to thereby apply an axial force upon the stud to cause frictional engagement between one side of the threads on the stud and one side of the threads in the hole and also frictionally resist rotation of said stud.

11. A stud fastening mechanism that includes a member having a threaded hole therein, a stud having a threaded portion thereon received in the threads of the threaded hole, the clearance between the threads on the threaded portion of the stud and the threads in the hole being greater than the maximum clearance permitted between such threads according to the tolerances allowed in standard thread practice whereby the threads on the stud are a relatively loose fit in the threads in the hole as gauged by standard thread practice, a member extending from the end of said stud toward the bottom of said hole having a diameter less than that of said hole, a member of rubber like material disposed within the threaded hole and engaged by said member extending from said stud to compress the rubber like material between said extending member and said hole to thereby apply an axial force upon the stud to cause frictional engagement between one side of the threads on the stud and one side of the threads in the hole and also frictionally resist rotation of said stud, and a body portion on said stud in juxtaposition to the innermost thread of said threaded portion having a diameter not greater than the minor or root diameter of the threads thereon to prevent localization of stress at the root diameter of said thread on said stud.

12. A stud fastening mechanism that includes a member having a threaded hole therein, a stud having a threaded portion thereon received in the threads of the threaded hole, the clearance between the threads on the threaded portion of the stud and the threads in the hole being greater than the maximum clearance permitted between such threads according to the tolerances allowed in standard thread practice whereby the threads on the stud are a relatively loose fit in the threads in the hole as gauged by standard thread practice, a member extending from the end of said stud toward the bottom of said hole having a diameter less than that of said hole, a member of rubber like material disposed within the threaded hole and engaged by said member extending from said stud to compress the rubber like material between said extending member and said hole to thereby apply an axial force upon the stud to cause frictional engagement between one side of the threads on the stud and one side of the threads in the hole and also frictionally resist rotation of said stud, and a body portion on said stud in juxtaposition to the innermost thread of said threaded portion having a diameter not greater than the minor or root diameter of the threads thereon and joined with the threaded portion of the stud by means of a curved stud body portion to prevent localization of stress at the root diameter of said thread on said stud.

OTTO M. SUMMERS.